United States Patent
Yoo et al.

(10) Patent No.: US 8,938,167 B2
(45) Date of Patent: Jan. 20, 2015

(54) APPARATUS AND METHOD FOR MANAGING DYNAMIC BANDWIDTH ALLOCATION TO SUPPORT LOW-POWER MODE IN PASSIVE OPTICAL NETWORK (PON)

(75) Inventors: Hark Yoo, Gwangju-si (KR); Young Suk Lee, Gwangju-si (KR); Sung Chang Kim, Gwangju-si (KR); Geun Yong Kim, Goyang-si (KR); Mun Seob Lee, Daejeon-si (KR); Dong Soo Lee, Gwangju-si (KR); Young Sun Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 116 days.

(21) Appl. No.: 13/588,156

(22) Filed: Aug. 17, 2012

(65) Prior Publication Data

US 2013/0071111 A1 Mar. 21, 2013

(30) Foreign Application Priority Data

Sep. 21, 2011 (KR) .................. 10-2011-0095110

(51) Int. Cl.
*H04B 10/272* (2013.01)
*H04Q 11/00* (2006.01)
(52) U.S. Cl.
CPC ......... *H04B 10/272* (2013.01); *H04Q 11/0067* (2013.01); *H04Q 2011/0064* (2013.01)
USPC .................. 398/38; 398/25; 398/58
(58) Field of Classification Search
CPC .................................................. H04B 10/272
See application file for complete search history.

(56) References Cited

U.S. PATENT DOCUMENTS

| 7,633,968 B2 | 12/2009 | Haran et al. | |
|---|---|---|---|
| 2006/0268704 A1 | 11/2006 | Ansari et al. | |
| 2009/0214209 A1* | 8/2009 | Ozaki | 398/58 |
| 2010/0111523 A1* | 5/2010 | Hirth et al. | 398/25 |
| 2011/0217041 A1* | 9/2011 | Yoshida et al. | 398/58 |
| 2012/0243871 A1* | 9/2012 | Huang et al. | 398/58 |

FOREIGN PATENT DOCUMENTS

| KR | 10-2009-0041163 | 4/2009 |
|---|---|---|
| WO | 2011/092822 A1 | 8/2011 |

OTHER PUBLICATIONS

Frank J. Effenberger, Huawei Technologies ,Next-Generation PON—Part III: System Specifications for XG-PON,Nov. 2009,IEEE Communications Magazine,0163-6804/09/$25.00 © 2009 IEEE, pp. 1-7.*

\* cited by examiner

*Primary Examiner* — David Payne
*Assistant Examiner* — Omar S Ismail
(74) *Attorney, Agent, or Firm* — Nelson Mullins Riley & Scarborough LLP; Anthony A. Laurentano, Esq.; Lewis Lee, Esq.

(57) ABSTRACT

An apparatus and method for managing a dynamic bandwidth allocation to support a low-power mode, in a passive optical network (PON) are provided. The apparatus may include a power saving mode managing unit to manage a power saving mode of at least one optical network unit (ONU), a bandwidth allocation parameter storage unit to store a bandwidth allocation parameter used for a power saving mode, and to maintain the stored bandwidth allocation parameter, and a dynamic bandwidth allocating unit to provide bandwidth allocation information to the at least one ONU, when the stored bandwidth allocation parameter is received.

6 Claims, 4 Drawing Sheets

APPARATUS AND METHOD FOR MANAGING DYNAMIC BANDWIDTH ALLOCATION TO SUPPORT LOW-POWER MODE IN PASSIVE OPTICAL NETWORK (PON)

CROSS-REFERENCE TO RELATED APPLICATION

This application claims the benefit of Korean Patent Application No. 10-2011-0095110, filed on Sep. 21, 2011, in the Korean Intellectual Property Office, the disclosure of which is incorporated herein by reference.

BACKGROUND

1. Field of the Invention

The present invention relates to an apparatus for managing dynamic bandwidth allocation that may be implemented in an optical line terminal (OLT), to support a low-power mode of an optical network unit (ONU) in a passive optical network (PON) system.

2. Description of the Related Art

Efforts to prevent CO2 emissions caused by global warming have been made globally. A green information technology (IT) based on 'green of IT' and 'green by IT,' is emerging as an important factor in research and development of IT.

Due to such a historical background, in an international telecommunication union-telecommunication standardization sector (ITU-T) SG15, G.sup45 was prepared on May, 2009, a gigabit passive optical network (GPON) power saving mechanism has been adopted as a baseline, and a low-power support scheme to be inserted in a standard draft of a 10-gigabit (XG)-PON1 has been discussed in detail in a full service access network (FSAN).

Additionally, a GreenTouch, namely a global consortium for improvement of a communication energy efficiency, is conducting researches to develop a technology for improving an energy efficiency by 1,000 times more than a current energy efficiency, which is led by Bell Labs that is the Alcatel-Lucent's research and development (R & D) organization.

A power saving scheme recommended by an XG-PON1, namely a standard of a next generation optical network of the ITU-T, is broadly classified into a dozing mode and a cyclic sleep mode. The dozing mode may refer to a scheme that needs to be applied in the power saving scheme for the XG-PON1 and that enables an optical network unit (ONU) to be switched to a power saving mode based on a trigger of an optical line terminal (OLT) or the ONU when there is no traffic received to a user network interface (UNI) and an access network interface (ANI) of the ONU.

A scheme of operating an ONU in the power saving mode may reduce power by deactivating an operation of an optical transceiver (OTRx), an XGPON media access control (MAC), an Ethernet switch, and the like that are included in the ONU. However, the dozing mode and the cyclic sleep mode may periodically deactivate only an optical signal transmission interface, instead of deactivating an optical signal reception interface of the ONU (an Rx of the OTRx).

Additionally, since an OLT continues to maintain a bandwidth allocated when an initial ONU is connected, while the ONU is operated in the power saving mode, an energy consumption efficiency of an Rx block of the XGPON MAC connected to the optical signal reception interface may be substantially the same as before the power saving mode.

Accordingly, since bandwidth allocation for upstream transmission of an ONU is equally performed in a normal mode, instead of the power saving mode, ONUs in the power saving mode may not respond to the bandwidth allocation. Thus, an OLT may detect an upstream transmission error of a corresponding ONU.

In addition, since a restricted upstream transmission bandwidth is used as a target of a dynamic bandwidth allocation algorithm for upstream bandwidth allocation, without distinguishing ONUs operated in the power saving mode from ONUs operated in the normal mode, an upstream transmission bandwidth may be wasted due to ONUs in the power saving mode in which upstream transmission is not performed actually, and accordingly the restricted upstream transmission bandwidth may be inefficiently used.

SUMMARY

According to an aspect of the present invention, there is provided an apparatus for managing a dynamic bandwidth allocation to support a low-power mode, including: a power saving mode managing unit to manage a power saving mode of at least one optical network unit (ONU); a bandwidth allocation parameter storage unit to store a bandwidth allocation parameter used for a power saving mode, and to maintain the stored bandwidth allocation parameter; and a dynamic bandwidth allocating unit to provide bandwidth allocation information to the at least one ONU, when the stored bandwidth allocation parameter is received.

According to another aspect of the present invention, there is provided an operation method of an apparatus for managing a dynamic bandwidth allocation to support a low-power mode, including: managing, by a power saving mode managing unit, a power saving mode of at least one ONU; storing, by a bandwidth allocation parameter storage unit, a bandwidth allocation parameter used for a power saving mode, and maintaining the stored bandwidth allocation parameter; and providing, by a dynamic bandwidth allocating unit, bandwidth allocation information to the at least one ONU, when the stored bandwidth allocation parameter is received.

EFFECT

According to embodiments of the present invention, information on a power saving mode of an optical network unit (ONU) may be provided to an apparatus for managing a dynamic bandwidth allocation of an optical line terminal (OLT), and accordingly a bandwidth for the power saving mode that is set in advance may be provided to ONUs operated in the power saving mode, in connection with the power saving mode. Thus, it is possible to solve an upstream transmission error detected from the OLT, while minimizing an amount of power used in a 10-gigabit passive optical network (XGPON) media access control (MAC) Rx block of an ONU operated in the power saving mode.

Additionally, according to embodiments of the present invention, it is possible to more efficiently use an upstream bandwidth, by allocating a bandwidth provided to ONUs operated in a power saving mode to ONUs operated in a normal mode.

Furthermore, according to embodiments of the present invention, bandwidth allocation information may be generated, based on information regarding whether each ONU enters a sleep mode, and information regarding whether an ONU in the sleep mode is currently in a sleep interval or an aware interval, and the generated bandwidth allocation information may be transmitted to each ONU so that upstream transmission is performed in only the aware interval. Accordingly, it is possible to minimize an amount of downstream traffic transferred to a corresponding ONU in intervals other than the aware interval of the ONU, and thus it is possible to minimize an amount of power used in an XGPON MAC Rx block of an ONU operated in the sleep mode.

Moreover, according to embodiments of the present invention, since an upstream transmission bandwidth is not allocated when ONUs operated in a sleep mode are in a sleep interval, a larger number of upstream bandwidths may be allocated to ONUs operated in a normal mode. Thus, it is possible to more efficiently use upstream bandwidths.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
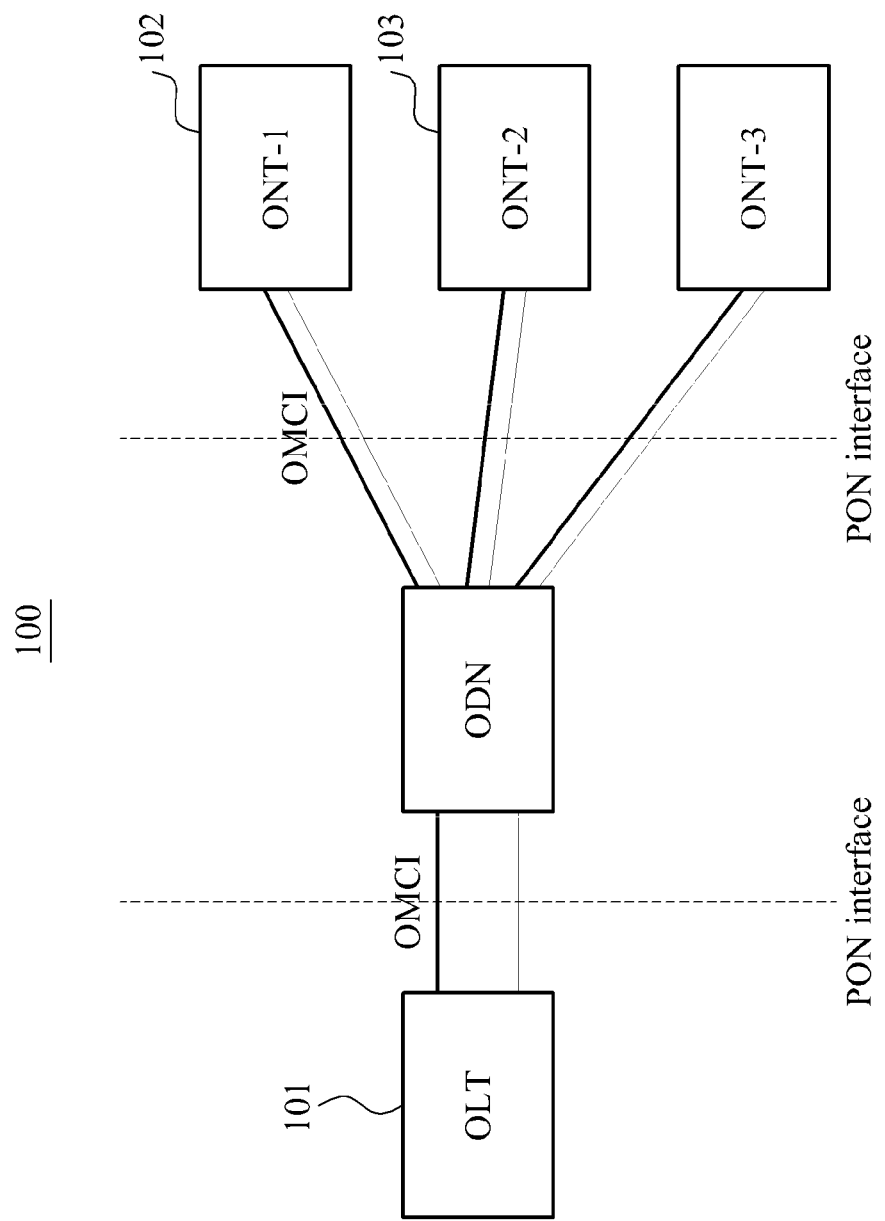
FIG. 1 is a diagram illustrating a passive optical network (PON)-based system, to which an apparatus for managing dynamic bandwidth allocation to support a low-power mode is applied, according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a passive optical network (PON)-based system 100 to which an apparatus for managing dynamic bandwidth allocation to support a low-power mode is applied according to an embodiment of the present invention. Hereinafter, the apparatus for managing dynamic bandwidth allocation to support a low-power mode will be referred to as a "dynamic bandwidth allocation management apparatus."

As shown in FIG. 1, the PON-based system 100 may have a structure in which a single optical line terminal (OLT) controls a plurality of optical network terminals (ONTs), unlike an Ethernet technology.

Additionally, the OLT may transmit data to all of the ONTs every 125 us, which may facilitate broadcasting and multicasting.

In the present invention, upstream transmission of an optical network unit (ONU) entering a low-power mode may be controlled, and accordingly an upstream transmission error occurring in an OLT may be solved, and an upstream bandwidth may be more efficiently used.

Specifically, information on a power saving mode of an optical network unit (ONU) may be provided, and accordingly a bandwidth for the power saving mode that is set in advance may be provided to ONUs operated in the power saving mode, in connection with the power saving mode. Thus, it is possible to solve an upstream transmission error detected from an optical line terminal (OLT), while minimizing an amount of power used in a 10-gigabit passive optical network (XGPON) media access control (MAC) Rx block of an ONU operated in the power saving mode. Additionally, a bandwidth provided to the ONUs operated in the power saving mode may be allocated to ONUs operated in a normal mode, and thus it is possible to more efficiently use an upstream bandwidth.

Figure 2:
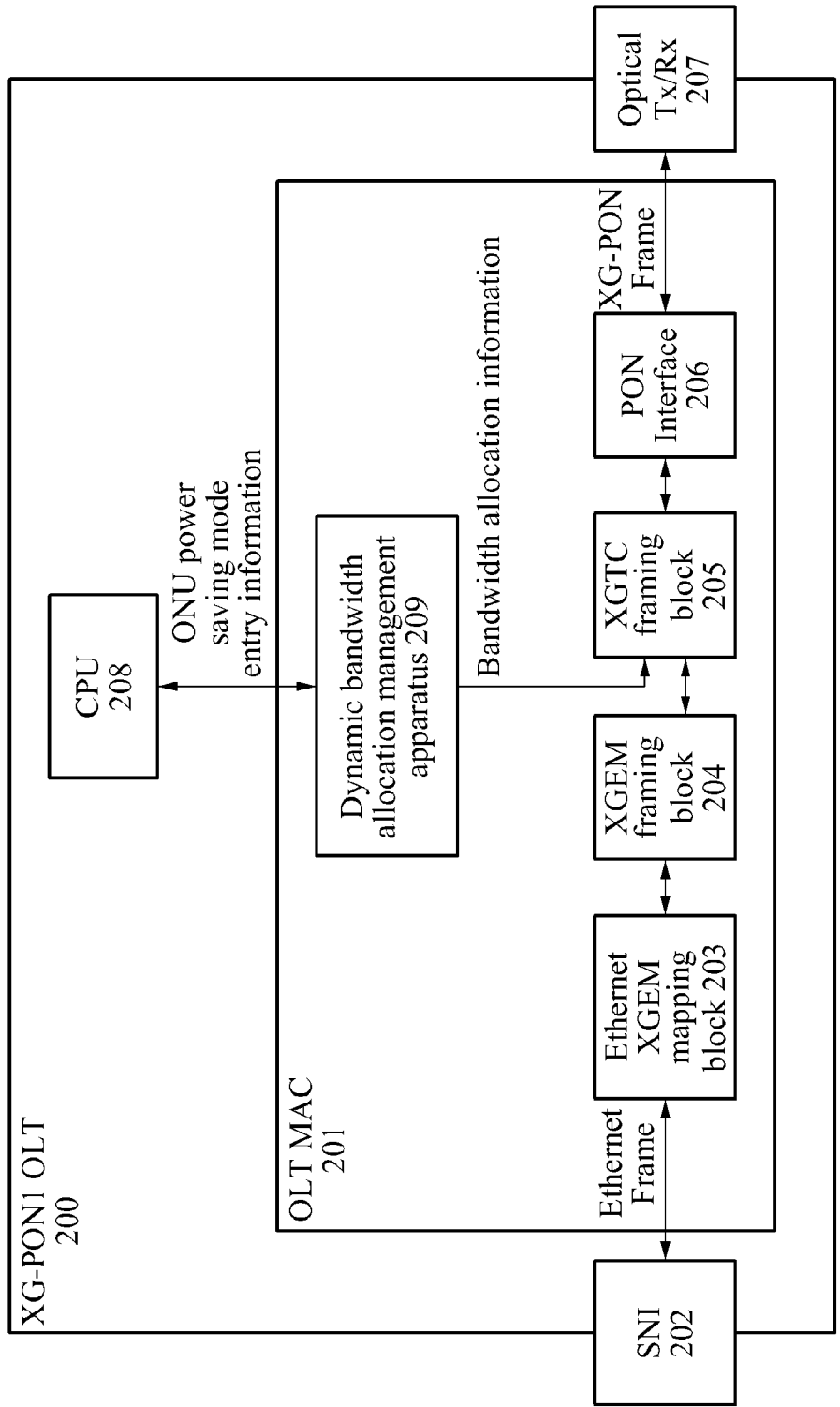
FIG. 2 is a block diagram illustrating an operation of an apparatus for managing dynamic bandwidth allocation to support a low-power mode, in an optical line terminal (OLT) according to an embodiment of the present invention.

FIG. 2 is a block diagram illustrating an operation of a dynamic bandwidth allocation management apparatus 209 in an XG-PON1 OLT 200 according to an embodiment of the present invention.

The XG-PON1 OLT 200 may broadly include an OLT MAC 201, a central processing unit (CPU) 208, a service network interface (SNI) 202, and an optical Tx/Rx 207. The SNI 202 may be used as an uplink interface, and the optical Tx/Rx 207 may transmit and receive an optical signal to and from a PON interval.

The dynamic bandwidth allocation management apparatus 209 may be implemented as one of elements included in the OLT MAC 201.

The dynamic bandwidth allocation management apparatus 209 may receive, from the CPU 208, information regarding whether each ONU enters a power saving mode, and may provide an XGTC framing block 205 with bandwidth allocation information of each ONU.

As a result, by using the dynamic bandwidth allocation management apparatus 209, a bandwidth for the power saving mode that is set in advance may be provided to ONUs operated in the power saving mode, in connection with the power saving mode. Thus, it is possible to solve an upstream transmission error detected from an OLT, while minimizing an amount of power used in an XGPON MAC Rx block of each of the ONUs operated in the power saving mode.

Additionally, by using the dynamic bandwidth allocation management apparatus 209, it is possible to more efficiently use an upstream bandwidth, by allocating a bandwidth provided to ONUs operated in a power saving mode to ONUs operated in a normal mode.

Furthermore, by using the dynamic bandwidth allocation management apparatus 209, bandwidth allocation information may be generated, based on information regarding whether each ONU enters a sleep mode, and information regarding whether an ONU in the sleep mode is currently in a sleep interval or an aware interval, and the generated bandwidth allocation information may be transmitted to each ONU so that upstream transmission is performed in only the aware interval. Accordingly, it is possible to minimize an amount of downstream traffic transferred to a corresponding ONU in intervals other than the aware interval of the ONU, and thus it is possible to minimize an amount of power used in an XGPON MAC Rx block of an ONU operated in the sleep mode.

Moreover, according to embodiments of the present invention, since an upstream transmission bandwidth is not allocated when ONUs operated in a sleep mode are in a sleep interval, a larger number of upstream bandwidths may be allocated to ONUs operated in a normal mode. Thus, it is possible to more efficiently use upstream bandwidths.

Figure 3:
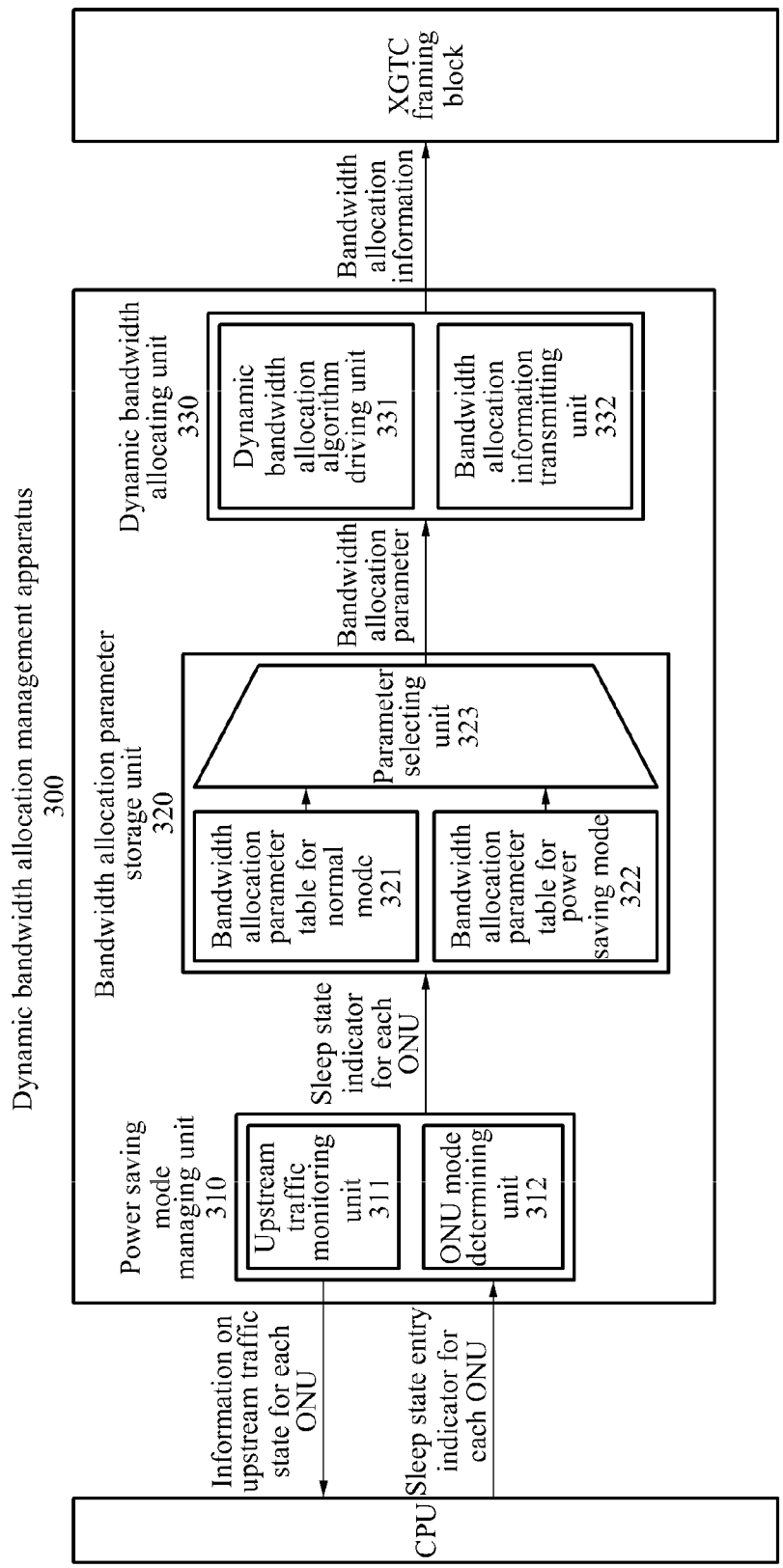
FIG. 3 is a block diagram illustrating an apparatus for managing dynamic bandwidth allocation to support a low-power mode according to an embodiment of the present invention.

FIG. 3 is a block diagram illustrating a dynamic bandwidth allocation management apparatus 300 according to an embodiment of the present invention.

The dynamic bandwidth allocation management apparatus 300 may include a power saving mode managing unit 310, a bandwidth allocation parameter storage unit 320, and a dynamic bandwidth allocating unit 330.

The power saving mode managing unit 310 may manage a power saving mode of at least one ONU.

Specifically, the power saving mode managing unit 310 may include an upstream traffic monitoring unit 311, and an ONU mode determining unit 312.

The upstream traffic monitoring unit 311 may determine whether upstream traffic of the at least one ONU exists, based on an upstream traffic counter.

For example, when the upstream traffic does not exist during a period exceeding a threshold that is set in advance, the upstream traffic monitoring unit 311 may control the at least one ONU to enter the sleep mode, using a CPU.

The ONU mode determining unit 312 may output information regarding whether the at least one ONU is currently in a sleep mode or an aware mode, and information regarding whether the at least one ONU targeted for bandwidth allocation enters the sleep mode.

In other words, the ONU mode determining unit 312 may receive information stating that the CPU enables a corresponding ONU to enter the sleep mode, may drive a timer and the like during a sleep interval and an aware interval, and may transfer, to the bandwidth allocation parameter storage unit 320, information regarding whether the corresponding ONU entering the sleep mode is currently in the sleep interval or the aware interval, and information regarding whether each ONU targeted for bandwidth allocation enters the sleep mode.

The bandwidth allocation parameter storage unit 320 may store a bandwidth allocation parameter used for the power saving mode, and may maintain the stored bandwidth allocation parameter.

Specifically, the bandwidth allocation parameter storage unit 320 may include a table storage unit to store a bandwidth allocation parameter table 321 for a normal mode and a bandwidth allocation parameter table 322 for a power saving mode. The bandwidth allocation parameter table 321 may be used in the aware mode, and the bandwidth allocation parameter table 322 may be used in the sleep mode.

Additionally, the bandwidth allocation parameter storage unit 320 may include a parameter selecting unit 323 to select a bandwidth allocation parameter, based on one of the sleep mode and the aware mode.

The dynamic bandwidth allocating unit 330 may provide bandwidth allocation information to the at least one ONU, when the stored bandwidth allocation parameter is received.

Specifically, the dynamic bandwidth allocating unit 330 may include a dynamic bandwidth allocation algorithm driving unit 331, and a bandwidth allocation information transmitting unit 332.

The dynamic bandwidth allocation algorithm driving unit 331 may determine an upstream transmission bandwidth based on the bandwidth allocation parameter. The bandwidth allocation information transmitting unit 332 may generate bandwidth allocation information based on the determined upstream transmission bandwidth, and may transmit the generated bandwidth allocation information to an XGTC framing block.

Specifically, the bandwidth allocation information transmitting unit 332 may generate a bandwidth allocation information filed to be loaded in an XGTC framing, based on the bandwidth allocation information received from an algorithm driving unit 309 based on the upstream transmission bandwidth received from the dynamic bandwidth allocation algorithm driving unit 331, and may transmit the generated bandwidth allocation information filed to the XGTC framing block.

Therefore, the dynamic bandwidth allocation management apparatus 300 may generate bandwidth allocation information, based on information regarding whether each ONU enters the sleep mode and information regarding whether an ONU in the sleep mode is currently in the sleep interval or the aware interval, and may transmit the generated bandwidth allocation information to each ONU, so that upstream transmission may be performed in the aware interval only.

Figure 4:
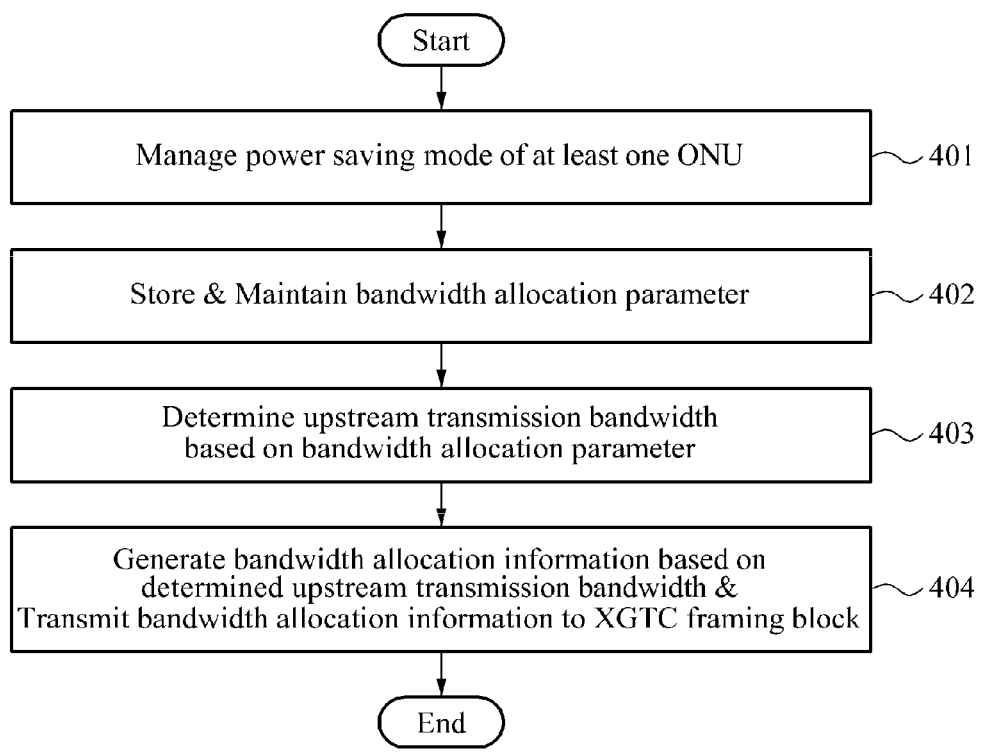
FIG. 4 is a flowchart illustrating an operation method of an apparatus for managing dynamic bandwidth allocation to support a low-power mode according to an embodiment of the present invention.

FIG. 4 is a flowchart illustrating an operation method of a dynamic bandwidth allocation management apparatus according to an embodiment of the present invention.

Referring to FIG. 4, in operation 401, a power saving mode managing unit may manage a power saving mode of at least one ONU.

In operation 402, a bandwidth allocation parameter storage unit may store a bandwidth allocation parameter used for the power saving mode, and may maintain the stored bandwidth allocation parameter.

When the stored bandwidth allocation parameter is received, a dynamic bandwidth allocating unit may provide bandwidth allocation information to the at least one ONU.

Specifically, in operation 403, the dynamic bandwidth allocating unit may determine an upstream transmission bandwidth based on the bandwidth allocation parameter. In operation 404, the dynamic bandwidth allocating unit may generate bandwidth allocation information based on the determined upstream transmission bandwidth, and may transmit the generated bandwidth allocation information to an XGTC framing block.

The operation method of a PON-based system according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for managing a dynamic bandwidth allocation to support a low-power mode, the apparatus comprising one or more servers configured to embody a plurality of functional units including:

a power saving mode managing unit to manage a power saving mode of at least one optical network unit (ONU);

a bandwidth allocation parameter storage unit to store a bandwidth allocation parameter used for a power saving mode, and to maintain the stored bandwidth allocation parameter; and a dynamic bandwidth allocating unit to provide bandwidth allocation information to the at least one ONU, when the stored bandwidth allocation parameter is received, wherein the bandwidth allocation parameter storage unit comprises a table storage unit to store a bandwidth allocation parameter table for a normal mode that is used in an aware mode, and a bandwidth allocation parameter table for a power saving mode that is used in a sleep mode, and a parameter selecting unit to select a bandwidth allocation parameter, based on one of the sleep mode and the aware mode.

2. The apparatus of claim 1, wherein the power saving mode managing unit comprises:

an upstream traffic monitoring unit to determine whether an upstream traffic of the at least one ONU exists, based on an upstream traffic counter; and an ONU mode determining unit to output information regarding whether the at least one ONU is currently in a sleep mode or an aware mode, and information regarding whether the at least one ONU targeted for bandwidth allocation enters the sleep mode.

3. The apparatus of claim 2, wherein, when the upstream traffic does not exist during a period exceeding a threshold that is set in advance, the upstream traffic monitoring unit controls the at least one ONU to enter the sleep mode, using a central processing unit (CPU).

4. The apparatus of claim 1, wherein the dynamic bandwidth allocating unit comprises:

a dynamic bandwidth allocation algorithm driving unit to determine an upstream transmission bandwidth based on the bandwidth allocation parameter; and a bandwidth allocation information transmitting unit to generate bandwidth allocation information based on the determined upstream transmission bandwidth, and to transmit the generated bandwidth allocation information to an XGTC framing block.

5. An operation method of an apparatus for managing a dynamic bandwidth allocation to support a low-power mode, the operation method comprising:

managing, by a power saving mode managing unit, a power saving mode of at least one optical network unit (ONU);

storing, by a bandwidth allocation parameter storage unit, a bandwidth allocation parameter used for a power saving mode, and maintaining the stored bandwidth allocation parameter; and providing, by a dynamic bandwidth allocating unit, bandwidth allocation information to the at least one ONU, when the stored bandwidth allocation parameter is received, wherein the storing the bandwidth allocation parameter further comprises storing a bandwidth allocation parameter table for a normal mode that is used in an aware mode, and a bandwidth allocation parameter table for a power saving mode that is used in a sleep mode, and selecting the bandwidth allocation parameter, based on one of the sleep mode and the aware mode.

6. The operation method of claim 5, wherein the providing comprises:

determining an upstream transmission bandwidth based on the bandwidth allocation parameter; and generating bandwidth allocation information based on the determined upstream transmission bandwidth, and transmitting the generated bandwidth allocation information to an XGTC framing block.

* * * * *